United States Patent
Taylor et al.

(10) Patent No.: US 6,537,599 B2
(45) Date of Patent: *Mar. 25, 2003

(54) METHOD FOR MAKING BAKERY GOODS AND BAKERY GOODS PREPARED THEREBY

(75) Inventors: Jana D. Taylor, Tualatin, OR (US); Valertine Brown, III, Taulatin, OR (US); Jay A. McConn, Woodburn, OR (US); Suzy J. Stonehill, Tigard, OR (US)

(73) Assignee: Mars, Incorporated, McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,437

(22) Filed: Nov. 6, 1998

(65) Prior Publication Data

US 2002/0071893 A1 Jun. 13, 2002

(51) Int. Cl.[7] ............................................. A21D 13/00
(52) U.S. Cl. ..................... 426/94; 426/283; 426/289; 426/295; 426/496; 426/549
(58) Field of Search ................ 426/94, 275, 283, 426/289, 295, 549, 496

(56) References Cited

U.S. PATENT DOCUMENTS

| 2,092,836 | A |   | 9/1937  | Engles et al. |
|-----------|---|---|---------|---------------|
| 2,666,410 | A |   | 1/1954  | Budny |
| 4,643,084 | A |   | 2/1987  | Gomez .......................... 99/352 |
| 4,643,904 | A |   | 2/1987  | Brewer et al. ............... 426/549 |
| 4,697,505 | A |   | 10/1987 | Brewer et al. .............. 99/450.1 |
| 4,738,859 | A | * | 4/1988  | Kenneally .................... 426/283 |
| 4,741,916 | A |   | 5/1988  | Heidel et al. ................ 426/549 |
| 4,760,778 | A |   | 8/1988  | Simelunas et al. .......... 99/450.1 |
| 5,104,667 | A |   | 4/1992  | Moeller ....................... 426/144 |
| 5,340,598 | A |   | 8/1994  | Hay, Jr. et al. |
| 5,460,843 | A |   | 10/1995 | Greene ........................ 426/392 |
| 5,671,661 | A |   | 9/1997  | Giamello .................... 99/450.7 |
| 5,741,536 | A |   | 4/1998  | Mauer et al. ................ 426/520 |
| 5,789,008 | A | * | 8/1998  | Monte ......................... 426/549 |

FOREIGN PATENT DOCUMENTS

| DE | 2506054  | 8/1976 |
| DE | 3228614  | 2/1984 |
| EP | 0312391  | 4/1999 |
| FR | 2744593  | 8/1997 |
| WO | 9826666  | 6/1998 |

OTHER PUBLICATIONS

Pillsbury Best Cookies Cookbook, pp. 10,13,49 and 56, 1997.*

* cited by examiner

*Primary Examiner*—Lien Tran
(74) *Attorney, Agent, or Firm*—Fitzpatrick, Cella, Harper & Scinto (57) ABSTRACT

A method is disclosed for preparing bakery goods having a plurality of edible particles on a top surface having substantially one hundred percent show and a home-made appearance. Also disclosed are novel baked goods prepared by the method and a novel cookie dough that has a transverse dimensional spread of at least 1.75 times after baking.

21 Claims, 3 Drawing Sheets

METHOD FOR MAKING BAKERY GOODS AND BAKERY GOODS PREPARED THEREBY

BACKGROUND OF THE INVENTION

1. Field of the Invention

The present invention relates to a method for making bakery goods that exhibit a high degree of edible particulate visibility. The method of this invention maximizes the visibility of edible particulates on the top surface of the bakery goods and provides a means for mass producing a product having a desirable home-made appearance. The invention also relates to bakery goods and the dough from which they are made.

2. Related Background Art

Baked goods, such as biscuits, cookies, brownies and the like, were all hand made until the early 19th century. Since that time, in Europe and the United States, many new varieties were born and the trade developed rapidly. In the United States, a major outgrowth of the early biscuit trade is a relatively mature cookie and cracker industry. Modern cookies take innumerable forms, from relatively soft, moist, short-shelf-life cookies to relatively hard, dry cookies which remain edible for relatively long periods of time. Other forms include cookies having a frosting or filling, and cookies with inclusions such as chocolate chips or nuts.

There are substantial differences between the home-made baked cookie and the machine-made baked cookie. In general, the texture of the home-made cookie is less homogeneous than that texture of the machine made cookie. When inclusions such as discrete edible particles are present, the inclusions are more uniformly distributed in a machine-made cookie than in a home-made cookie. When the edible particles are distributed on the surface of the cookie, their distribution is more uneven in the home-made cookie. Such homogeneity of the machine-made cookie is generally the result of (i) the large batches of material that are generally used that require more thorough mixing, (ii) the large machinery that mix more thoroughly, and (iii) the high speeds that the mechanized processes are run at for efficiency.

Most types of home-made baked food products are generally characterized by a random, non-uniform topography. The topography results from the hand-shaping of the dough into a desired shape prior to baking. The home-prepared food product may also contain discrete pieces of edible particles as inclusions or the edible particles may be placed on the surface of the food product. Examples of such particles include chocolate chips, butterscotch chips, nutmeats, bits of fruit such as raisins, and sugar coated candies such as M&M's® brand chocolate candies or Reeses Pieces®.

The inclusion particles can be distributed throughout the baked good. However, the inclusion particles have a higher degree of visibility when the particles are on the surface of the baked food product. Thus, inclusion particles are often distributed on the top surface of home-baked goods prior to baking.

In contrast, as discussed above, baked food products made commercially generally have a uniform topography due to the automated processes employed. As a result of considerations of speed and mass throughput, most high-speed manufacturing methods of making baked food products such as chocolate chip cookies, containing inclusion particles, are typically prepared by mixing the inclusion particles into the cookie dough. A continuous process is used to form a dough rope having the particles randomly distributed within the cookie dough. The cookie dough is then cut into individual pieces, i.e., dough preforms, using a cutting wire. The dough preforms are baked to form the cookie containing the particles.

A significant disadvantage, however, is that the majority of the discrete particles are contained within the cookie and are not visible on the outer surface of the cookie. Surveys have found that consumers generally prefer a food product that prominently shows edible particles compared to a food product having included particles that are less visible. Moreover, this lack of "show" in baked food products is economically disadvantageous since the edible particles are generally a more expensive component than the dough. Accordingly, processes to increase the visibility of particle inclusions at the surface of the food products are highly desirable.

An example of a method to improve the show of inclusion particles is disclosed in U.S. Pat. No. 4,643,904. This patent describes a method to increase the visibility of edible material in baked foods by penetrating a continuously moving dough rope, containing distributed food particles, with pins or various disk means that engage and transversely move a portion of the randomly distributed particles through a preselected peripheral area of the continuously moving dough rope that corresponds to a preselected surface of the baked products. This method does not, however, result in one hundred percent show. Moreover, dough containing hard or large edible particulates are difficult to wire cut.

Current baked food product methods that employ a wire cutting process to form dough preforms disadvantageously allow for the inclusion of only very small food particles in the dough. Larger food particles will frequently cause breakage of the cutting wire or the particles may be forced out of the dough by the wire as it passes through the dough across the extruder nozzle. This results in a waste of food particles and in some cases complete disruption of the production process in order to fix the broken wire. Furthermore, the larger particles may prevent the wire from cutting all the way through the dough resulting in random tearing of portions of the dough pieces. Also, as the wire encounters relatively large particles, the wire may cause excessive lateral movement of a given dough piece or non-uniform lateral movement of a given dough piece to dough piece. Random displacement of the severed dough pieces results in a non-uniform arrangement of the dough pieces on the conveyor belt or band upon which the dough pieces land. The non-uniform arrangement of the dough pieces can lead to dough piece transfer problems with respect to other belts or non-uniform baking of the pieces.

One manner of avoiding the use of a wire cutter is described in U.S. Pat. No. 4,741,916. This patent describes a method and apparatus for producing individual dough pieces of substantially constant size and shape by passing a continuous dough rope between a pair of horizontally reciprocating cutting elements. The use of such cutting device does not provide a means of improving show of edible particles and its success on dough containing large particulates is dubious.

The use of a wire cutter is also avoided in U.S. Pat. No. 5,104,667 which discloses making a cookie preform from a continuous rope of dough through the use of mechanical fingers. The resulting cookies are said to have a highly variegated topography. While it is asserted that the visibility of inclusions may be improved, this method does not provide one hundred percent visibility. In addition, the fingers may damage certain inclusions.

One potential solution to increase the visibility of edible particles in a baked food product would be to sprinkle additional pieces of edible particles on the dough preform's outer surface prior to baking the preform. An attempt of this is described in U.S. Pat. No. 4,643,084, which describes a machine for making cookies in which dough is extruded from a cylinder and deposited onto a conveyor belt. The machine sprinkles particulate material onto the conveyor belt for application to the underside of the cookie and sprinkles onto the cookies themselves. However, depending on the tackiness of the preform's outer surface, it is quite likely that much of the particle material would fall off—either prior to or during the baking step. Accordingly, such methods are not generally commercially feasible without a dough formulation developed specifically for the required tackiness while still maintaining good baking and other processing properties. Moreover, U.S. Pat. No. 4,643,084 forms the shape of the cookie with cutting knifes after the dough has been deposited. This mass cutting makes it difficult to obtain a home-made appearance.

There are certain inherent limitations in the known dough formulae and in the methods by which they are prepared. Known doughs are limited, for example, in the "spread" that is achievable when the raw dough is baked. The maximum achievable spread in known typical cookie doughs is believed to be about 150%. That is, in the example of a round cookie, the maximum achievable ratio of the diameter of a baked cookie to the diameter of the raw dough preform is 1.5 to one.

Such limitations of known doughs impose undesirable constraints on products that can be manufactured from the doughs. For example, the amount of dough required to produce a cookie of a desired diameter is greater than would be the case with a dough exhibiting a greater "spread". The greater amount of dough required by the limitations of known doughs presents a heretofore insurmountable obstacle in further reducing the cost of producing a cookie of any given diameter. In another aspect, the achievable spread ratio of known doughs dictates that for a given dough diameter, a cookie will have a thickness which cannot be further reduced without an additional process step to flatten the preform.

A method to overcome the above described problems and provide a bakery good having a home made appearance with edible particles having maximal visibility would be highly desirable.

SUMMARY OF THE INVENTION

The present invention is related to a high-speed manufacturing method for producing various types of bakery food products or goods that exhibit a high degree of edible particle visibility, i.e., the edible particles are readily visible by casually inspecting the product's outer surface. The high-speed manufacturing method also provides a bakery food product with a desirable home-baked appearance. For example, the edible particles appear to have been hand-placed on the dough prior to baking. As used herein bakery food product or goods includes baked goods and preforms which may be subsequently baked, for example, at home by the consumer. The preforms may be partially baked or unbaked and may be fresh or frozen.

In particular, one embodiment of this invention is directed to a method of preparing a bakery good having a plurality of edible particles on a top surface of said bakery good, said method comprising the steps of (i) forming a dough plug from raw baking dough;

(ii) depositing said dough plug on a conveying surface having edible particles disposed thereon so that said plurality of edible particles are incorporated on a surface of said dough plug;

(iii) inverting said dough plug so that the incorporated edible particles are on a top surface of said dough plug; and (iv) optionally baking said dough plug to form a baked good having the plurality of edible particles on the top surface.

Another embodiment of this invention is directed to the bakery good prepared by the above described method. Preferably, the bakery good of this invention is a baked good and more preferably a cookie.

Yet another embodiment of this invention is directed to a cookie dough comprising an admixture of:

(a) fat in an amount of about 15 to about 20 percent by weight of the dough, wherein said fat is selected from the group consisting of shortening, margarine, butter and mixtures thereof;

(b) sugar in an amount of about 25 to about 35 percent by weight of the dough, wherein said sugar is selected from the group consisting of sucrose, glucose, fructose, lactose, maltose and mixtures thereof;

(c) flour in an amount of about 30 to about 40 percent by weight of the dough;

(d) egg or egg substitute in an amount of about 0 to about 10 percent by weight of the dough;

(e) ammonium bicarbonate of about 0.1 to about 1.5 percent by weight of the dough; and (f) salt in an amount of about 0.25 to about 0.6 percent by weight of the dough.

Of particular significance is that baked goods prepared using the above described dough have an improved "spread", i.e., the final dimension in a transverse direction of the baked good, e.g., the diameter of a cookie, is at least 1.75 times as large as an initial dimension in the transverse direction of the raw dough plug. The spread associated with the dough of this invention assists in providing a commercially mass produced baked good having edible particles on the surface thereof that appear to have been hand placed.

BRIEF DESCRIPTION OF THE DRAWINGS

The drawings do not imply any limitation of the scope of the invention and minor variations on the location and detailed design of features herein described are considered within the purview of this invention.

DETAILED DESCRIPTION OF THE INVENTION

The bakery goods prepared by the method of this invention, while preferably cookies, also include other areas of the baked products art, including, for example, cakes, rolls, pastries, brownies and the like.

As used herein, the term "dough" is intended to include a wide variety of edible materials such as cookie dough, pastry dough, bread dough, confectionery, etc. The term "dough" rope or simply "rope" is intended to mean a continuous rod of such edible material formed by any one of the various known techniques such as extruding, rolling, etc. The term "dough plug" is intended to mean a relatively small, discrete piece of dough that has, for example, been cut or sliced from a dough rope for processing into the final food product.

The term "cookie" as used herein is intended to include any baked product being similar to a cookie no matter what shape or form. Similarly, the term "dough" is intended to mean any dough that is suitable for making bakery goods within the broadest meaning of that term. Such a dough is usually an unbaked mixture of ingredients typically containing, for example, flour, shortening (such as for example margarine or butter), fat, water and a leavening agent, e.g., sodium bicarbonate or ammonium bicarbonate.

The term "edible particle" is intended to include a wide variety of discrete pieces of edible particulate material (also referred to as food particles, flavor chips, inclusions and morsels) that are either solid or semi-solid, which may be either naturally or artificially flavored, and include, without limitation, confections, nuts, dough pieces, coconut, fruits and the like. Particular examples of edible particles include chips such as chocolate, butter scotch, or peanut butter, caramel; fruit pieces or dehydrated fruit pieces such as orange, banana, strawberry, apples, pineapples, mangoes, raisins, currants, or sultanas; nuts or pieces of nuts such as pecan nuts, hazel nuts, walnuts, peanuts, almonds, macadamia nuts or other types of nuts; hard or soft candy pieces, including sugar shelled chocolate candies such as M&M's® brand chocolate candies or Reeses Pieces®; cereals; or mixtures of particulate flavoring ingredients. The sugar shelled chocolate candies used in this invention may have complete chocolate centers or other centers such as peanuts, almonds, peanut butter, crispy centers and the like.

The present invention provides a method for increasing the visibility of discrete edible particles on a surface of a bakery food product. Significantly, the method of this invention achieves substantially one hundred percent show of the edible particles, i.e., none of the edible particles are hidden below the surface of the bakery good, thus providing maximum visibility.

As previously indicated, one embodiment of this invention is directed to a method of preparing a bakery good having a plurality of edible particles on a top surface of the bakery good, said method comprising the steps of
  (i) forming a dough plug from raw baking dough;
  (ii) depositing the dough plug on a conveying surface having edible particles disposed thereon so that the plurality of edible particles are incorporated on a surface of the dough plug;
  (iii) inverting the dough plug so that the incorporated edible particles are on a top surface of said dough plug; and
  (iv) optionally baking said dough plug to form a baked good having the plurality of edible particles on the top surface.

Preferably, the dough plug having the plurality of edible particles on the top surface is baked. However, the dough plug may be left unbaked or only partially baked, if desired, and supplied to the consumer for final baking. It is also possible to freeze the dough plug having the plurality of edible particles on the top surface. Of course, the baked good may also be frozen if desired.

The dough plug may be formed by any means desired, e.g., extrusion, rolling, rotary molding or use of a positive displacement cavity. Typically the dough plug is formed by extruding or rolling and then wire cutting the raw baking dough. The dough plug may take any form or shape as desired. While it is generally cylindrical or puck shaped to form a round cookie, other novelty shapes are also possible, e.g., stars, trees, characters and the like.

The dough plug may be deposited by any desirable means on the conveying surface carrying the edible particles. For example, the dough plug may be dropped in place after cutting or set in place by mechanical means. While any surface of the dough plug may be set onto the edible particles on the conveying surface, it is preferable that the surface opposed to the last cut surface be deposited on the edible particles.

The edible particles are preferably set out on the conveying surface in a single layer. Generally, the conveying surface having the edible particles disposed thereon is continuously moving. However, it is also possible to practice the invention by incrementally moving the conveying surface after each deposit.

It is preferable to recycle the edible particles that are not incorporated on the bottom of the dough plug. This recycle can be readily achieved by placing a gap between two conveying surfaces. The gap should be large enough to allow the particles to pass through while not allowing the bakery good to do the same. While recycle is preferable, there is also a need to reduce recycle because recycle can result in broken or damaged edible particles.

To conserve edible particles, as well as to reduce recycle needs and potential damage to particles during recycle it is preferable to practice the method of this invention on a conveying surface having lanes to direct the edible particles to an area of deposit of the dough plug. Thus, the edible particles are directed into a lane or lanes that run longitudinal to the direction of conveyance. Each lane is aligned relative to an area of deposit of the dough plug on the conveyance surface to maximize particle incorporation onto the bottom surface of the dough plug. The lanes need not run the entire distance of the conveyor surface, but instead need only be long enough to provide the desired direction to the particles being transported on the conveyor surface.

The efficient use of edible particles and reduction of recycle can be further enhanced by providing the edible particles to the above described lanes in discontinuous or segmented batches. Each batch of particles is provided to the conveyor surface in a manner synchronized to provide that batch at the area of deposit on the conveyor surface at a time of a deposit of a dough plug. This can be accomplished by simply impeding a continuous flow to create a batch. This can be done, for example, by providing a gate or a start stop pulsation mode to the lane which is coordinated (e.g., by mechanical or electrical communication means) with the wire cutter so that a batch of edible particles is allowed into each lane at the appropriate time. In a particularly preferred embodiment of this invention, such batches of edible particles are created by pulsing a vibratory tray that delivers edible particles to the conveying surface.

After the dough plug has been deposited on the edible particles on the conveyor surface the dough plug having the edible particles incorporated on the bottom surface thereof is moved down stream. As previously noted, a gap in the conveyor surface may be provided to assist in recycle. If desired, the dough plug may also be run under pressure exerting rollers which ensure that the edible particles are secured to the bottom surface of the dough plug. The pressure provided by such rollers need only be slight.

The dough plug having the edible particles secured or incorporated thereon is then inverted so that the particles are now on the top surface of the dough plug. This step is critical to achieving the desired spread and home-made appearance of the resulting baked good. If the dough plug is not flipped then the edible particles are not satisfactorily "carried" by the spread and thus there will be an undesirable concentration of particles. Furthermore, without flipping, the bakery goods will not have the desired home-made appearance and the show of the edible particles will not be maximized. The inversion of the dough plug can be performed by any means, e.g., by hand or mechanical means. For mass production, however, the preferred means is to move the dough plug along a first conveyance surface to the end point of the first conveyance surface and then drop the dough plug onto a second conveyance surface so that the dough plug flips one hundred and eighty degrees, i.e., the bottom surface of the dough plug on the first conveyance surface is now the top surface on the second conveyance surface. Many techniques exist for flipping the dough plug. See, e.g., U.S. Pat. No. 5,460,843 which discloses a means of selectively inverting a single cookie in a series so that the top surface of the endmost cookies are facing outwardly. The vertical distance between a first conveying surface and a second conveying surface necessary to cause an inversion of the dough plug can be readily calculated by one of ordinary skill in the art. Similarly, it is also known to provide an inclined ramp prior to transfer from one conveying surface to another to invert a cookie.

Of course, if desired a plurality of dough plugs may be deposited on the conveying surface of the present inversion having edible particles disposed thereon. More preferably, the present method may be practiced by employing a plurality of lanes on the conveying surface to conserve particulate material. As described herein, the term lane means an area on the conveyor surface that may be defined by fences, rails, a channel or any means that guides the edible particles in a desired path on the conveyor surface.

After the dough plugs have been inverted, the dough plugs may be baked, prebaked or frozen for later baking. Preferably the raw dough plugs having the edible particles on a top surface are conveyed into a baking oven. The temperature of the baking oven will generally range between about 176° C. to about 215° C. Most preferably the baking oven will have a plurality of temperature zones, and more preferably each zone will have controls for the top and bottom of each zone as well as the side of the zones. The baking oven will also preferably have air flow means, and more preferably each zone will have air flow means capable of independent settings. The actual optimum temperature and air flows set for each zone can be readily determined by one of ordinary skill in the baking art.

After baking the bakery good is cooled either ambiently or with assisted cooling. Assisted cooling is particularly preferred if the edible particles are sensitive to the heat generated during baking, e.g., chocolates.

In a preferred embodiment of the method of this invention the raw baking dough is a cookie dough comprising:

(a) fat in an amount of about 15 to about 20 percent by weight of the dough;
(b) sugar in an amount of about 25 to about 35 percent by weight of the dough;
(c) flour in an amount of about 30 to about 40 percent by weight of the dough;
(d) egg or egg substitute in an amount of about 0 to about 10 percent by weight of the dough;
(e) at least one leavening agent; and
(f) salt.

Significantly, when the above described cookie dough is baked the baked good has a final dimension in a transverse direction that is at least 1.75 times as large as an initial dimension in the transverse direction of the dough plug. More preferably the final dimension is at least about 2 times greater than the initial dimension. Preferably at least one leavening agent is selected from the group consisting of ammonium bicarbonate, baking soda and mixtures thereof. Most preferably, ammonium bicarbonate is present in the raw dough in an amount of about 0.1 to about 1.5 percent by weight of the dough.

Using the cookie dough described above, baked cookies are obtained with a moisture content of about 4 to about 7 percent by weight of the cookie and a desirable spread, e.g., 1.75 times or greater.

Preferably the fat used in the cookie dough is selected from the group consisting of vegetable shortening, tropical oils, margarine, butter and mixtures thereof. The fats, which may be from any edible source, can be pure, modified or hydrogenated. As defined herein the term fat also includes natural and synthetic fat substitutes such as, for example, Olestra®, fruit pectins, gums and the like. As used herein, the sugar may be a natural sugar, a non-nutritive sweetener or mixtures thereof. Preferably, the sugar is selected from the group consisting of sucrose, glucose, fructose, lactose, maltose and mixtures thereof. More preferably, the sugar is sucrose selected from the group consisting of refined sucrose, brown sucrose and mixtures thereof.

The flour used in the cookie dough of this invention may be derived from any edible source such as wheat flour, oat flour or the like, and may be bleached or unbleached. Preferably, the flour is an unbleached pastry flour. In addition, it is preferable for salt to be present in an amount of about 0.25 to about 0.6 percent by weight of the dough. The cookie dough may further comprises at least one additive selected from the group consisting of flavorants, preservatives, colorants and dough conditioning agents.

Significantly, it has been discovered that baked goods prepared by the method of this invention can use relatively small amounts of dough to achieve a relatively large baked good. In a particularly preferred embodiment it has been found that the transverse dimension in millimeters of said baked good to the gram weight of the dough plug is a ratio of at least 4:1.

Yet another embodiment of this invention is directed to a bakery good having a plurality of edible particles on a top surface of said bakery good, said bakery good prepared by the method comprising the steps of:

(i) forming a dough plug from raw baking dough;
(ii) depositing said dough plug on a conveying surface having edible particles disposed thereon so that said plurality of edible particles are incorporated on a surface of said dough plug;
(iii) inverting said dough plug so that the incorporated edible particles are on a top surface of said dough plug; and
(iv) optionally baking said dough plug to form a baked good having the plurality of edible particles on the top surface.

The preparation of the preferred bakery goods of this invention have already been generally described. The most preferred bakery goods are cookies, most preferably baked cookies.

A particularly preferred cookie may be prepared by mixing suitable amounts of biscuit flour, margarine, sugar and water in proportions giving a relatively short dough being suitable for splitting on a conventional wire-cutting apparatus. The cookie dough is fed from a hopper downwardly toward one or more nozzles located above a conveyor belt. The conveyor belt is covered with a layer of candy pieces, e.g., M&M's® Milk Chocolate Minis. As the dough is extruded from the nozzle, a cutting wire is passed through the dough so that discrete pieces of dough referred to as dough plugs are separated from the dough mass and fall down onto the candy pieces on the conveyor belt. The discrete candy pieces stick to the bottom side of the dough plugs. The dough plugs are then conveyed across a gap in the belt that allows any excess candy pieces to drop through the gap and return to the candy hopper that feeds the conveyor belt. The dough plugs with the candy pieces located on the bottom side of the dough are moved up an inclined belt at an angle that allows the dough plugs with the candy pieces to flip over so that the candies are on the top of the dough after landing on a subsequent belt. The dough plugs with the candies are then passed through an oven for prompt baking, or the dough plugs may be collected from the conveyor belt for later baking. The final baked cookie with candy pieces has a substantial number of candy pieces that are on the top surface area of the cookie. Upon casual inspection of the cookies' outer surface, substantially one hundred percent of the candy pieces are visible. The baked cookies may be placed in suitable packaging for shipping.

The baked cookies of this invention are also highly suitable for use in the preparation of ice cream sandwiches, particularly when prepared with ammonium bicarbonate as a leavening agent. It is believed that the ammonium bicarbonate reacts early on in the bake cycle and gives a good spread and provides for a tight grain structure which prevents moisture migration. Thus, another embodiment of this invention is directed to an edible snack comprising two opposing baked cookie layers and a fat based cream layer disposed therebetween. Each opposing cookie has a plurality of edible particles on its outer surface. The cookies employed in the edible snack are baked cookies prepared by the methods described herein.

Yet another embodiment of this invention is directed to a cookie dough comprising an admixture of:

(a) fat in an amount of about 15 to about 20 percent by weight of the dough, wherein said fat is selected from the group consisting of shortening, margarine, butter and mixtures thereof;

(b) sugar in an amount of about 25 to about 35 percent by weight of the dough, wherein said sugar is selected from the group consisting of sucrose, glucose, fructose, lactose, maltose and mixtures thereof;

(c) flour in an amount of about 30 to about 40 percent by weight of the dough;

(d) egg or egg substitute in an amount of about 0 to about 10 percent by weight of the dough;

(e) ammonium bicarbonate of about 0.1 to about 1.5 percent by weight of the dough; and (f) salt in an amount of about 0.25 to about 0.6 percent by weight of the dough.

In one preferred embodiment of the invention, the above described cookie dough is formulated and formed into raw dough plugs. The dough plugs may be conveyed to an oven where the raw dough plugs are baked to form finished cookies. In one aspect of the invention, the novel dough formulation of the invention provides a finished cookie which has a diameter that is preferably about 175%, and most preferably about 200% the diameter of the raw dough plug. This degree of increase in the diameter of the baked cookie relative to the raw dough plug is novel to the baking art, and provides significant advantages. A cookie having a desired diameter can be produced with less dough than otherwise possible with known formulations. It is believed that prior art dough formulations provide at best about a 150% diameter increase when baked. Prior art doughs therefore require more dough to achieve a desired diameter of cookie than the dough of this invention.

In another aspect of the invention, the cookie dough embodies a consistency in which satisfies countervailing requirements of a baking dough suitable for handling in the highly automated process steps commonly employed in commercial cookie manufacture. In particular, the raw dough is sufficiently thick and viscous to be suitable for use with dough extruders or molders, while at the same time being able to spread to preferably at least about 175%, and more preferably to about 200% of the diameter of the raw dough plug. Stated differently, in a baking dough according to the invention, a round dough plug that weighs $x$ grams will, when baked, expand to a cookie having a diameter of at least about $4x$ millimeters. At the same time, the dough reliably produces finished cookies having a uniform shape and diameter.

As previously noted, in the method of this invention the extruded raw dough plugs are placed atop a layer of edible particles such as candies or nuts. In one preferred embodiment, the particles are the well-known lentil shaped M&M® brand chocolate candies. The raw dough plug is flipped to turn the particle-bearing surface upward. The particles remain substantially on the surface of the dough plugs during transport to the baking oven and during baking. Using the novel cookie dough of this invention, the particles remain exposed on the upper cookie surface and spread apart as the cookie expands during baking. The high degree of expansion during baking provides a finished product having the commercially desirable number of particulates distributed on the upper surface of the cookie. This commercially "automated" placement of a repeatable number of particulates on the raw dough plug significantly results in a baked good having a home made appearance that may be prepared with high speed processing.

The example which follows is intended as an illustration of certain preferred embodiments of the invention, and no limitation of the invention is implied.

EXAMPLE

A 3 inch (7.6 cm) diameter baked cookie was desired from a raw dough plug that weighs about 19 grams. It was further desired that the upper surface of the cookie contain 11–13 round candies on the top surface of the cookie, each candy having a diameter of about ⅜ of an inch (0.95 cm). It was also essential that this combination of features be achieved using modern automated processing equipment.

This combination of features was achieved by the present invention as follows.

A baking dough was formulated by first combining 150 pounds of shortening; 31.5 pounds of margarine; 159 pounds of Baker's special sugar, 145 pounds of cane brown sugar, (C&H # 6251 available from Californian and Hawaiian Sugar Co., San Francisco, Calif.); 1.58 pounds of natural butter flavor; and 5.35 pounds of N&A vanilla. After vigorously mixing the foregoing for five minutes, 80 pounds of whole egg liquid and 1.16 pounds of ammonium bicarbonate were added, and the resulting mixture was vigorously mixed for two minutes. Next, 317 pounds of unbleached pastry flour (White Spear Brand flour from Fischer Mills, Seattle, Wash.) was added to the mixture without mixing. Finally, 5.23 pounds of fine granulated salt and 4.22 pounds of baking soda were placed atop the flour, and the entire mixture was mixed gently for 3 minutes. During formulation, the temperatures of the ingredients were controlled to provide a finished raw dough temperature not exceeding 65° F. (18.3° C.). The baking dough was loaded into the hopper of a dough extruder as explained in more detail below.

Figure 1:
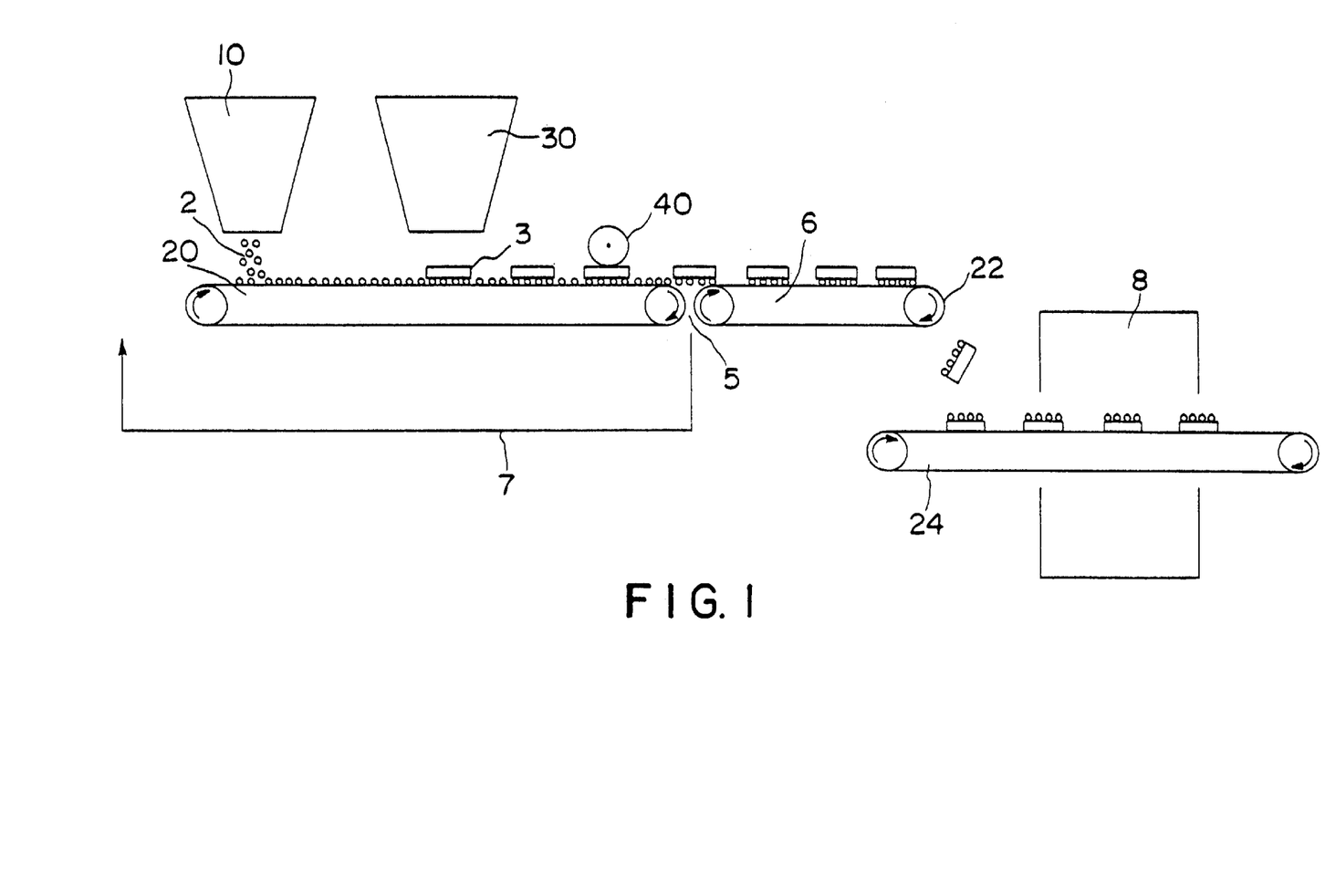
FIG. 1 is a schematic representation of a preferred embodiment of the method of the invention.
Figure 2:
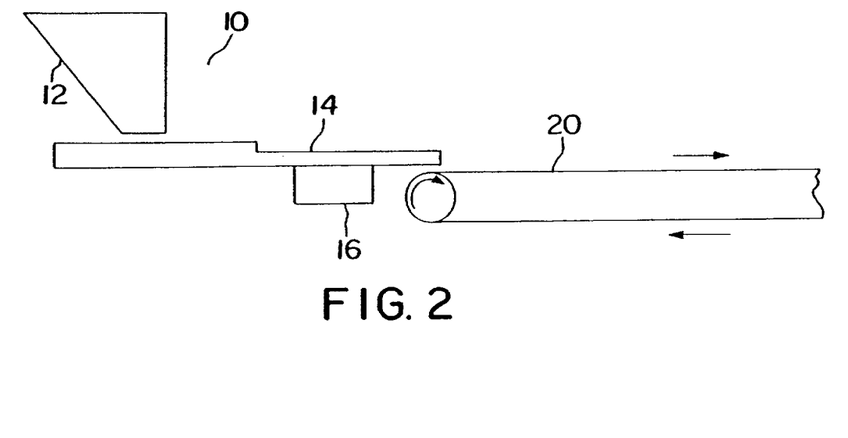
FIG. 2 is a side elevational view of a particulate dispenser that may be employed in the method of this invention.
Figure 3:
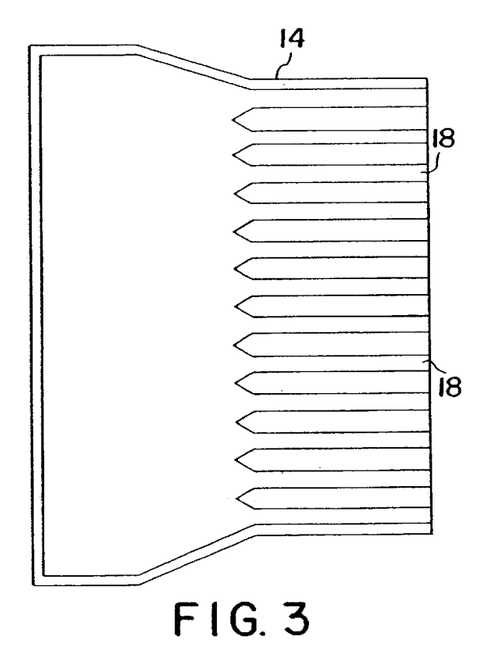
FIG. 3 is a top plan view of the corrugated discharge bed portion of the particulate dispenser shown in FIG. 2.
Figure 4:
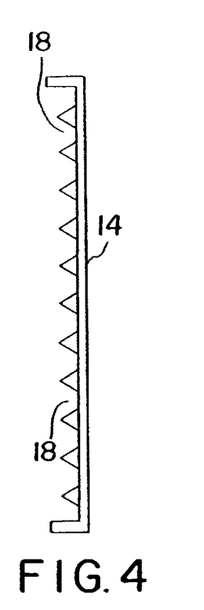
FIG. 4 is a frontal view of the corrugated discharge bed shown in FIG. 3.

Referring to FIG. 1, the candies 2 were dispensed from edible particle dispensing apparatus 10 onto a first moving conveyor belt 20. While the particles were M&M's® brand chocolate candies, other particles such as nuts, fruit portions, other confections, or other preformed shapes could be substituted as desired. FIG. 2 illustrates a preferred dispensing apparatus 10 including a hopper 12, a corrugated discharge belt 14, and a shaker 16. The terminal end of the discharge bed is situated over conveyor belt 20. Candies are loaded into hopper 12, and flow by gravity and the action of shaker 16 into "lanes" 18 illustrated in FIG. 4 which is a frontal view of corrugated discharge bed 14. In the embodiment shown in FIG. 3, which is a top view of corrugated discharge bed 14, the corrugated discharge bed includes 11 "lanes" in which candies are transported from the hopper and discharged onto a moving conveyor belt 20 (FIGS. 1, 2). In an important aspect of the invention, the candies are discharged in closely-packed relation onto conveyor 20. By closely-packed it is meant that the candies are discharged onto and travel along conveyor 20 closely spaced, preferably touching, in a single layer. As will be further discussed below, by providing lanes of closely spaced candies, or other particulates as desired, in combination with a predetermined diameter of dough plug, the number of candies or particles placed on each raw dough plug can be controlled with acceptable precision.

Figure 5:
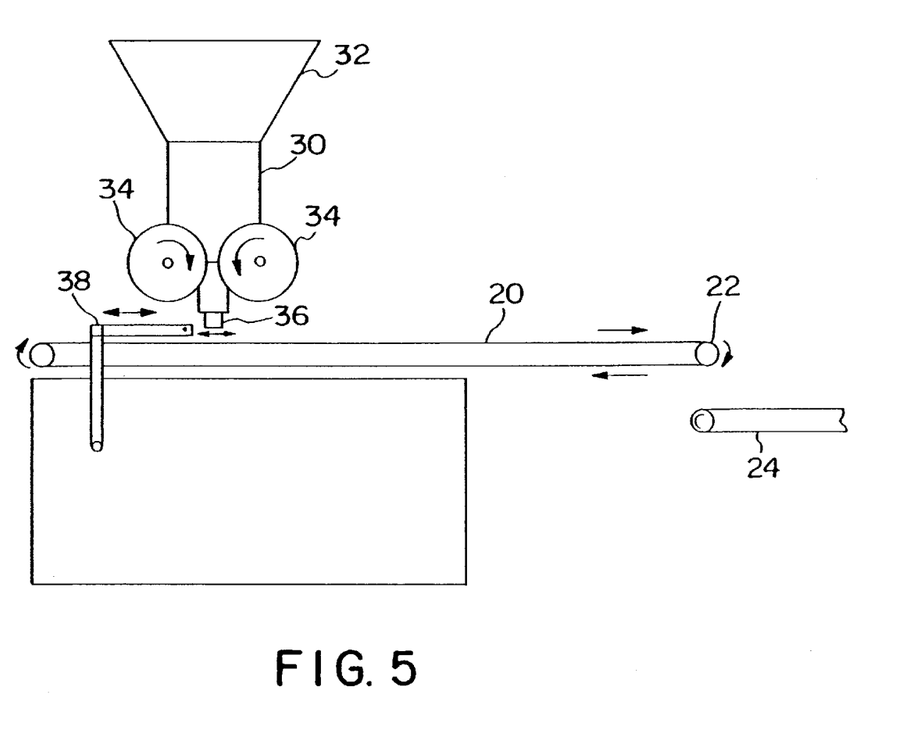
FIG. 5 is a side elevational view of the dough hopper, wire cut machine, and conveyor.

Referring again to FIG. 1, a dough extruder 30 is located at a second location along the conveyor "downstream" from the particulate dispensing apparatus 10 and dough plugs 3 are discharged therefrom onto candies 2. Referring to FIG. 5, extruder 30 includes a hopper 32, a pair of feed rolls 34 for drawing dough from the hopper 32 and forcing it through an extruding die 36. As the dough is extruded from the dies it is cut by a taut wire, supported by a steel frame 38, which passes across the face of the dies. The frequency of the cuts is dictated by the desired production rate, which is achieved by adjusting the speed of the machine. The die cups and matching filler block are manufactured to produce desired product shape and size. The shape of the die cups and filler blocks required to achieve the desired shape of the raw dough plug is well-known to those skilled in the art. The thickness/weight of the cookie is controlled by increasing or decreasing the speed of the rolls to give more or less excision for each stroke of the wire.

In the preferrer embodiment, extruder 30 includes multiple extruding heads 36 laterally spaced across the width of the conveyor 20. Each of the multiple extruding heads is laterally aligned with one of the discharge lanes 11 of the particulate dispensing apparatus. As the dough is extruded from each extruder head 36, a wirecut apparatus 38 periodically cuts a "plug" of dough 3, which falls onto the underlying conveyor 20. The wirecut apparatus 38 accepts either a bulk or metered feed of dough in the top mounted hopper. A pair of saw toothed rolls draw the dough from the hopper and pushes it through the filler block to the dies.

By virtue of the alignment of the respective discharge lanes 11 and extruder heads 36, each dough plug falls onto an area of conveyor 20 which is covered with a single layer of closely packed candies (or other particles). By dispensing the candies onto conveyor 20 in a closely packed pattern, and by producing dough plugs having a predetermined shape and size, a predetermined number of particles can be applied to each dough plug by placing or dropping the dough plug onto the closely packed particulates. In this way, a predetermined number of candies or particulates can be applied to each cookie with only minor variations.

Conveyor 20 next travels beneath a roller 40 that provides a gently compressive force on the dough plug as it passes beneath the roller, ensuring that the candies are adhered to the bottom surface of the dough plug. Conveyor 20 terminates at end 22, which is positioned above a final conveyor 24. As each dough plug is discharged from conveyor 20 onto conveyor 24, the dough plug is flipped over so that the surface to which the candies are adhered is turned about 180° to face upwardly. In the process of doing so, excess candies fall from the conveyor 22 and may be separated from the dough plugs by slightly angulating conveyor 24 so that the excess candies run off the conveyor and are discarded or preferably recycled to the hopper 12 of dispensing apparatus 10. Conveyor 24 transports the dough plugs to an oven 8 for baking. Referring to FIG. 1, it is also possible to transport dough plug 3 over a gap 5 to a second conveyor 6 and collect particles for recycle as shown by recycle stream 7. In this embodiment, if desired, conveyor 6 may be inclined to assist in flipping the dough plug. In the preferred embodiment, the cookie is baked to a final moisture content of 4.5–6%. The applicant has achieved best results with multi-zone oven which utilizes hot, recirculating air to bake product transposed through the oven on a steel band or mesh belt. Baking of the product above the band is accomplished by convection (direct heat) and radiation (indirect heat). The bottom of the product is baked by conduction, with the band heated by convection or radiation. The choice of convection or radiation heating is controlled by dampers located at both end of each heating zone. An exhaust blower exhausts a portion of the recirculating air from both top and bottom ducts. After baking, the cookie is further processed or packaged as required prior to shipping.

Other variations and modifications will be obvious to those skilled in the art. This invention is not limited except as set forth in the claims.

What is claimed:

1. A method of preparing a bakery good having a plurality of edible particles on a top surface of said bakery good, said method comprising the steps of:
   (i) forming a dough plug from raw baking dough that is a cookie dough comprising:
      (a) fat in an amount of about 15 to about 20 percent by weight of the dough;
      (b) sugar in an amount of about 25 to about 35 percent by weight of the dough;
      (c) flour in an amount of about 30 to about 40 percent by weight of the dough;
      (d) egg or egg substitute in an amount of about 0 to about 10 percent by weight of the dough;
      (e) at least one chemical leavening agent; and
      (f) salt;
   (ii) depositing said dough plug on a conveying surface having edible particles disposed thereon so that said plurality of edible particles are incorporated on a bottom surface of said dough plug, wherein said edible particles are sugar shelled chocolate candies;
   (iii) inverting said dough plug so that the incorporated edible particles are on a top surface of said dough plug; and (iv) optionally baking said dough plug to form a baked good having said plurality of edible particles on the top surface;

wherein when said bakery good is baked, said baked good has a final dimension in a transverse direction that is at least 1.75 times as large as an initial dimension in the transverse direction of said dough plug and wherein none of the edible particles from the conveying surface are hidden below the top surface of the baked good.

2. The method according to claim 1, wherein said dough plug having the plurality of edible particles on the top surface is baked.

3. The method according to claim 1, further comprising the step of freezing said dough plug having the plurality of edible particles on the top surface.

4. The method according to claim 1, wherein said dough plug is formed by extruding and wire cutting said raw baking dough.

5. The method according to claim 1, further comprising directing said edible particles into a lane on said conveying surface that is longitudinal to a direction of conveyance and which is aligned relative to an area of deposit of said dough plug on said conveying surface.

6. The method according to claim 5, further comprising providing said edible particles to said lane in discontinuous batches in a manner synchronized to provide a singular batch of edible particles at the area of deposit on said conveyance surface at a time of each deposit.

7. The method according to claim 1, further comprising the step of recycling excess edible particles.

8. The method according to claim 1, wherein said step of inverting comprises dropping said dough plug from an end point of a first conveyance surface on to a second conveyance surface in a manner that flips said dough plug so that the edible particles are on the top surface of the dough plug.

9. The method according to claim 8, wherein said dough plug is flipped about 180 degrees.

10. The method according to claim 1, wherein a plurality of dough plugs are simultaneously deposited on said conveying surface.

11. The method according to claim 1, wherein said step of baking comprises heating said dough plug at a temperature of about 176° C. to about 215° C.

12. The method according to claim 1, wherein said at least one leavening agent is selected from the group consisting of ammonium bicarbonate, baking soda and mixtures thereof.

13. The method according to claim 12, wherein ammonium bicarbonate is present in the raw dough in an amount of about 0.1 to about 1.5 percent by weight of the dough.

14. The method according to claim 13, wherein the baked good has a moisture content of about 4 to about 7 percent by weight of the baked good.

15. The method according to claim 1, wherein the fat is selected from the group consisting of vegetable shortening, tropical oils, margarine, butter and mixtures thereof.

16. The method according to claim 1, wherein the sugar is selected from the group consisting of sucrose, glucose, fructose, lactose, maltose and mixtures thereof.

17. The method according to claim 16, wherein the sugar is sucrose selected from the group consisting of refined sucrose, brown sucrose and mixtures thereof.

18. The method according to claim 1, wherein the flour is selected from the group consisting of bleached flour, unbleached flour and mixtures thereof.

19. The method according to claim 1, wherein salt is present in an amount of about 0.25 to about 0.6 percent by weight of the dough.

20. The method according to claim 1, wherein said cookie dough further comprises at least one additive selected from the group consisting of flavorants, preservatives, colorants and dough conditioning agents.

21. The method according to claim 1, wherein said transverse dimension in millimeters of said baked good to a gram weight of said dough plug is a ratio of at least 4:1.

* * * * *